(12) United States Patent
Moon et al.

(10) Patent No.: US 11,249,917 B2
(45) Date of Patent: Feb. 15, 2022

(54) DATA STORAGE DEVICE AND OPERATING METHOD THEREOF

(71) Applicant: SK hynix Inc., Gyeonggi-do (KR)

(72) Inventors: Min Hwan Moon, Seoul (KR); Duck Hoi Koo, Gyeonggi-do (KR); Soong Sun Shin, Gyeonggi-do (KR); Ji Hoon Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/851,930

(22) Filed: Apr. 17, 2020

(65) Prior Publication Data

US 2020/0242044 A1 Jul. 30, 2020

Related U.S. Application Data

(63) Continuation of application No. 15/829,025, filed on Dec. 1, 2017, now Pat. No. 10,628,323.

(30) Foreign Application Priority Data

Apr. 28, 2017 (KR) .................. 10-2017-0055433

(51) Int. Cl.
*G06F 12/10* (2016.01)
*G06F 12/121* (2016.01)
(Continued)

(52) U.S. Cl.
CPC .......... *G06F 12/10* (2013.01); *G06F 12/0246* (2013.01); *G06F 12/121* (2013.01);
(Continued)

(58) Field of Classification Search
CPC .................. G06F 12/0246; G06F 2212/7201
See application file for complete search history.

(56) References Cited

U.S. PATENT DOCUMENTS

2013/0080732 A1* 3/2013 Nellans ............... G06F 12/0246
711/206
2014/0089629 A1 3/2014 Griffin et al.
(Continued)

FOREIGN PATENT DOCUMENTS

CN 1447242 A 10/2003
CN 101027668 A 8/2007
(Continued)

OTHER PUBLICATIONS

Jianjun et al., A solid-state drive controller design based on 4 KB-size flash translation layer, Microelectronics Technology, Apr. 2017.
(Continued)

*Primary Examiner* — Edward J Dudek, Jr.
(74) *Attorney, Agent, or Firm* — IP & T Group LLP

(57) ABSTRACT

An operating method for a data storage device includes providing a nonvolatile memory device including a plurality of pages; segmenting an address map which maps a logical address provided from a host device and a physical address of the nonvolatile memory device, by a plurality of address map segments according to a segment size that is set depending on a quality of service time allowed to process a request of the host device and an unprocessed workload; and flushing at least one of the address map segments in the nonvolatile memory device after processing the unprocessed workload.

14 Claims, 7 Drawing Sheets

(51) Int. Cl.
   *G06F 12/02* (2006.01)
   *G06F 12/0868* (2016.01)

(52) U.S. Cl.
   CPC .. *G06F 12/0868* (2013.01); *G06F 2212/1016* (2013.01); *G06F 2212/1024* (2013.01); *G06F 2212/205* (2013.01); *G06F 2212/7201* (2013.01)

(56) References Cited

U.S. PATENT DOCUMENTS

| | | |
|---|---|---|
| 2014/0281173 A1 | 9/2014 | Im et al. |
| 2014/0337560 A1 | 11/2014 | Chun et al. |
| 2017/0024326 A1 | 1/2017 | Luo et al. |

FOREIGN PATENT DOCUMENTS

| | | |
|---|---|---|
| CN | 101251789 A | 8/2008 |
| CN | 102087586 A | 6/2011 |
| CN | 102681792 A | 9/2012 |
| CN | 103425600 A | 12/2013 |
| CN | 103530062 A | 1/2014 |
| CN | 104102585 A | 10/2014 |
| CN | 105122218 A | 12/2015 |
| CN | 105242881 A | 1/2016 |
| CN | 106294215 A | 1/2017 |
| CN | 106326134 A | 1/2017 |
| CN | 106527987 A | 3/2017 |
| CN | 106605209 A | 4/2017 |
| WO | 2012/161659 A1 | 11/2012 |

OTHER PUBLICATIONS

Office Action issued by China National Intellectual Property Administration dated Apr. 6, 2021 for Chinese Patent Application No. 201711472082.X.

Zhang X et al., YouChoose: A Performance Interface Enabling Convenient and Efficient QoS Support for Consolidated Storage Systems, 2011, IEEE.

Zhang J et al., Static wear-leveling strategy for flash memory, Computer Applications, May 2006, pp. 1205-1207, vol. 26, No. 5.

Notice of Allowance issued by the State Intellectual Property Office (SIPO) on China dated Sep. 15, 2021.

Certificate of Invention Patent issued by the CNIPA dated Nov. 12, 2021.

\* cited by examiner

SGSZ = DT_QoS - DT_UPWKL

DT_QoS = maximum count X super page (SP) size $$= \left\lceil \frac{tQos}{tPROG} \right\rceil \times (\text{page (PG) size} \times \text{plane (PL) number} \times \text{die (D) number})$$

DATA STORAGE DEVICE AND OPERATING METHOD THEREOF

CROSS-REFERENCES TO RELATED APPLICATION

This application is a continuation of U.S. patent application Ser. No. 15/829,025 filed on Dec. 1, 2017, which claims priority under 35 U.S.C. § 119(a) to Korean application number 10-2017-0055433, filed on Apr. 28, 2017. The disclosure of each of the foregoing applications is incorporated herein by reference in its entirety.

BACKGROUND

1. Technical Field

Various embodiments generally relate to a data storage device employing a nonvolatile memory device as a storage medium.

2. Related Art

Recently, the paradigm for the computer environment has been converted into ubiquitous computing so that computer systems can be used anytime and anywhere. As a result, the use of portable electronic devices such as mobile phones, digital cameras, and notebook computers has rapidly increased. In general, such portable electronic devices use a data storage device which employs a memory device. A data storage device is used to store data to be used in a portable electronic device.

A data storage device employing a memory device provides advantages in that, since there are no mechanical driving parts, stability and durability are excellent, an information access speed is high and power consumption is small. Data storage devices having such advantages include a universal serial bus (USB) memory device, memory cards having various interfaces, a universal flash storage (UFS) device, and a solid state drive (SSD).

SUMMARY

Various embodiments are directed to a data storage device capable of improving quality of service and stably storing address mapping information, and an operating method thereof.

In an embodiment, an operating method for a data storage device may include: providing a nonvolatile memory device including a plurality of pages; segmenting an address map which maps a logical address provided from a host device and a physical address of the nonvolatile memory device, by a plurality of address map segments according to a segment size that is set depending on a quality of service time allowed to process a request of the host device, and an unprocessed workload; and flushing at least one of the address map segments in the nonvolatile memory device after processing the unprocessed workload.

In an embodiment, a data storage device may include: a nonvolatile memory device including a plurality of pages which are included in planes of dies; a random access memory suitable for storing an address map which maps a physical address of the nonvolatile memory device and a logical address provided from a host device; and a control unit suitable for controlling the nonvolatile memory device by referencing the address map loaded on the random access memory, and processing a request of the host device, wherein the control unit segments the address map by a plurality of address map segments according to a segment size that is set depending on a quality of service time allowed to process the request of the host device and an unprocessed workload.

According to the embodiments, quality of service of the data storage device may be improved, and address mapping information may be stably stored.

DETAILED DESCRIPTION

Figure 1:
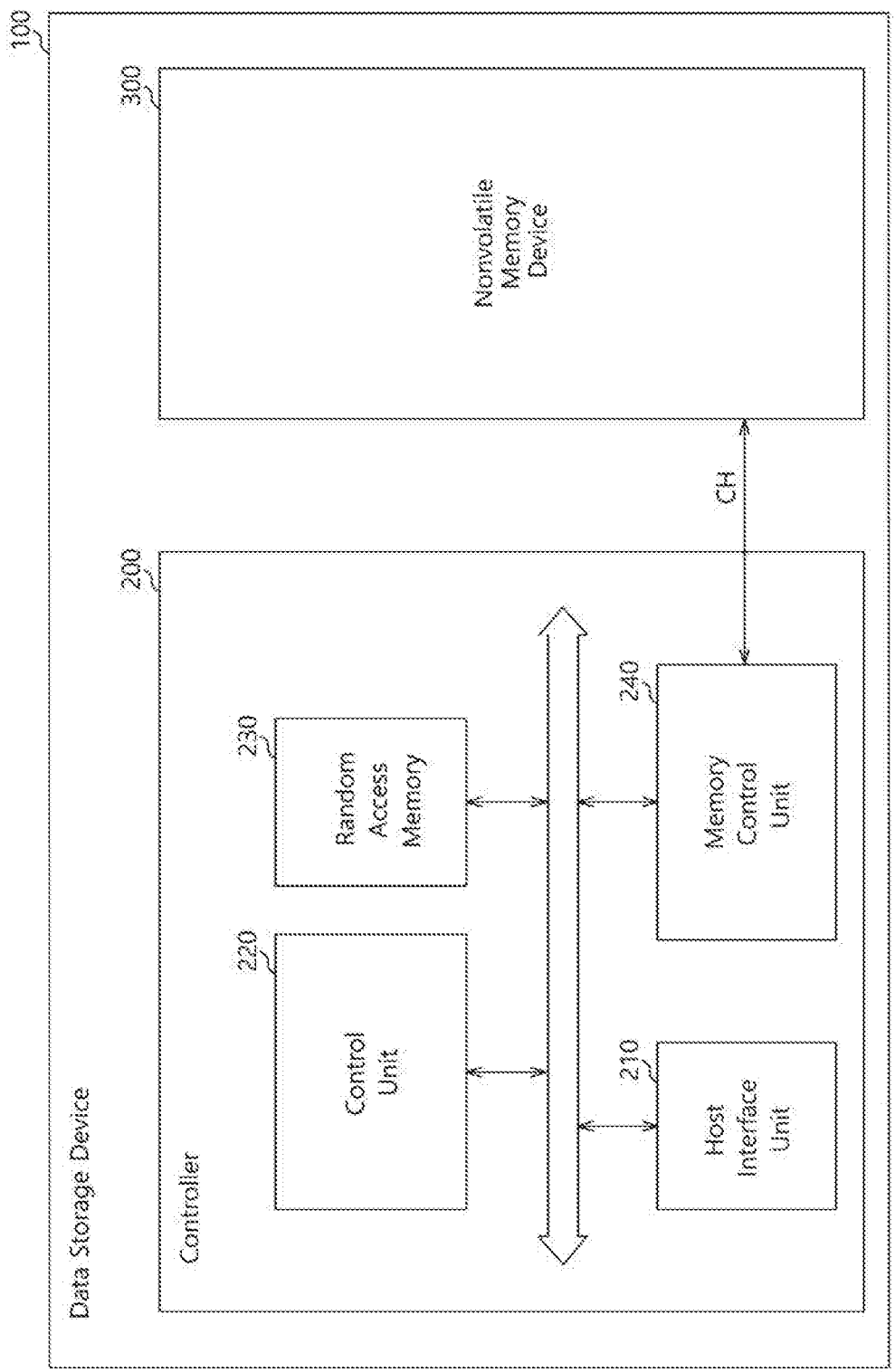
FIG. 1 is a block diagram illustrating a data storage device in accordance with an embodiment of the present invention.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device and an operating method thereof will be described below with reference to the accompanying drawings through various examples of embodiments.

FIG. 1 is a block diagram illustrating a data storage device 100 in accordance with an embodiment of the present invention.

The data storage device 100 may store data to be accessed by a host device (not shown) such as a mobile phone, an MP3 player, a laptop computer, a desktop computer, a game player, a TV, an in-vehicle infotainment system, and so forth. The data storage device 100 may also be referred to as a memory system.

The data storage device 100 may be manufactured as any one of various types of storage devices according to a host interface which is a transmission protocol interfacing the data storage device 100 with the host device. For example, the data storage device 100 may be configured as any one of various types of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so forth.

The data storage device 100 may be manufactured as any one among various types of package types. For example, the data storage device 100 may be manufactured as any one of various types of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a controller 200 and a nonvolatile memory device 300. The controller 200 may include a host interface unit 210, a control unit 220, a random access memory 230, and a memory control unit 240.

The host interface unit 210 may interface the host device and the data storage device 100. For example, the host interface unit 210 may communicate with the host device by using a host interface, that is, any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-E) protocols.

The control unit 220 may be configured by a micro control unit (MCU) or a central processing unit (CPU). The control unit 220 may process a request which is transmitted from the host device. In order to process the request, the control unit 220 may drive an instruction or algorithm of a code type, that is, a software, loaded on the random access memory 230, and may control internal function blocks or the nonvolatile memory device 300.

The random access memory 230 may be configured by a random access memory such as a dynamic random access memory (DRAM) or a static random access memory (SRAM). The random access memory 230 may store a software to be driven by the control unit 220. Further, the random access memory 230 may store data necessary for driving the software. That is, the random access memory 230 may operate as the working memory of the control unit 220.

The random access memory 230 may temporarily store data to be transmitted from the host device to the nonvolatile memory device 300 or from the nonvolatile memory device 300 to the host device. In other words, the random access memory 230 may operate as a data buffer memory or a data cache memory.

The memory control unit 240 may control the nonvolatile memory device 300 according to control of the control unit 220. The memory control unit 240 may also be referred to as a memory interface unit. The memory control unit 240 may provide control signals to the nonvolatile memory device 300. The control signals may include a command, an address, a control signal and so forth for controlling the nonvolatile memory device 300. The memory control unit 240 may provide data to the nonvolatile memory device 300 or may be provided with data from the nonvolatile memory device 300.

The nonvolatile memory device 300 may be coupled with the controller 200 through a channel CH which includes at least one signal line capable of transmitting a command, an address, control signals and data. The nonvolatile memory device 300 may be used as the storage medium of the data storage device 100.

The nonvolatile memory device 300 may be configured as any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide.

Figure 2:
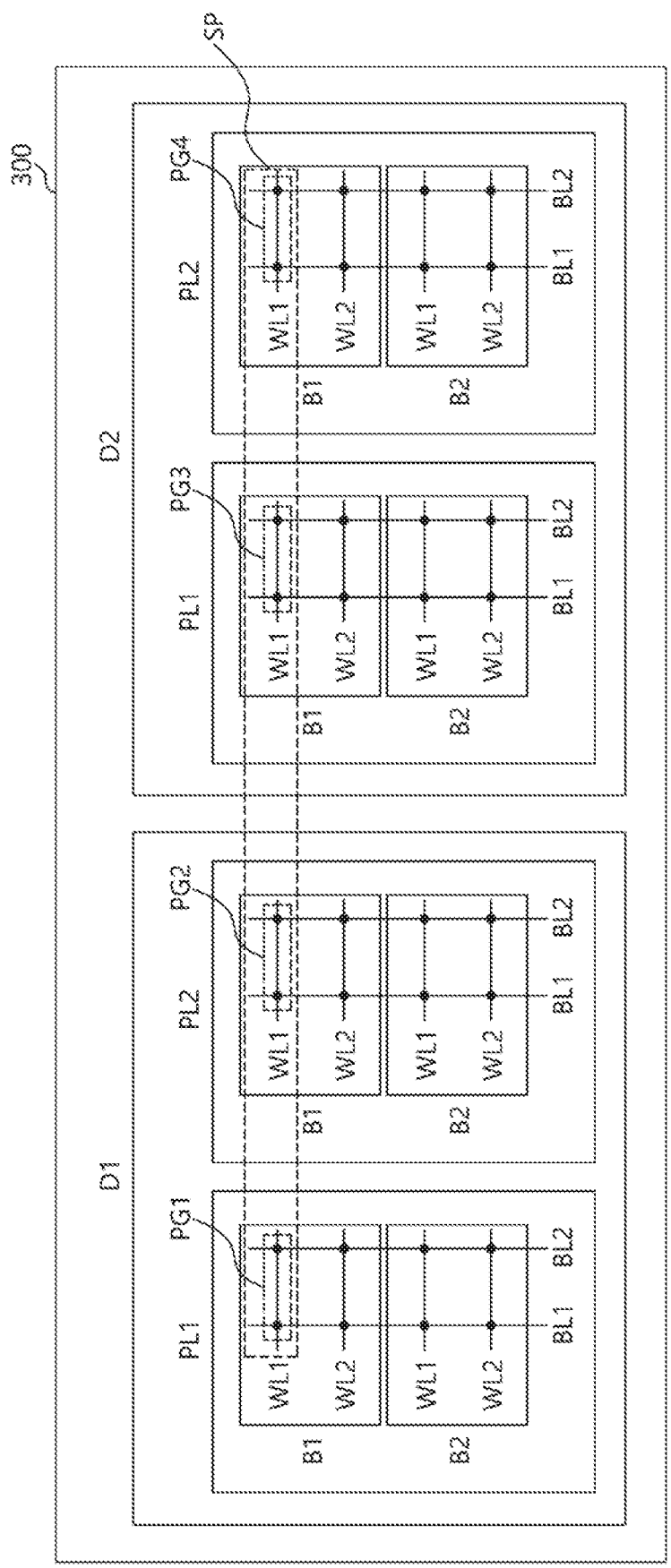
FIG. 2 is a diagram describing a memory cell region and a program unit of a nonvolatile memory device shown in FIG. 1.

FIG. 2 is a diagram describing a memory cell region and a program unit of the nonvolatile memory device 300 shown in FIG. 1. As an example, the nonvolatile memory device 300 which is configured by two dies D1 and D2, two planes PL1 and PL2 per die and two memory blocks B1 and B2 per plane is illustrated. Each of the memory blocks B1 and B2 will be exemplified to include four memory cells which are arranged at areas where two word lines WL1 and WL2 and two bit lines BL1 and BL2 intersect with each other. The number of dies, the number of planes, the number of memory blocks per plane and the number of memory cells per memory block in the nonvolatile memory device 300 may be changed variously.

From an operational viewpoint, or a physical or structural viewpoint, the memory cells of the nonvolatile memory device 300 may be configured by a hierarchical memory cell set or memory cell unit. For example, memory cells which are coupled to the same word line and are to be read, and programmed or written simultaneously may be configured as a page. Also, memory cells to be erased simultaneously may be configured as a memory block. Further, memory cells to be controlled in parallel by different write drivers and sense amplifiers (not shown) may be configured as different planes.

To increase a data processing amount, pages which are operable in parallel may be configured as a super page SP. For example, a first page PG1 included in the first plane PL1 of the first die D1, a second page PG2 included in the second plane PL2 of the first die D1, a third page PG3 included in the first plane PL1 of the second die D2 and a fourth page PG4 included in the second plane PL2 of the second die D2 may be configured as one super page SR Therefore, when a plurality of pages are configured as one super page SP, the super page SP may be defined as the unit of memory cells which are read or programmed at one time.

Figure 3:
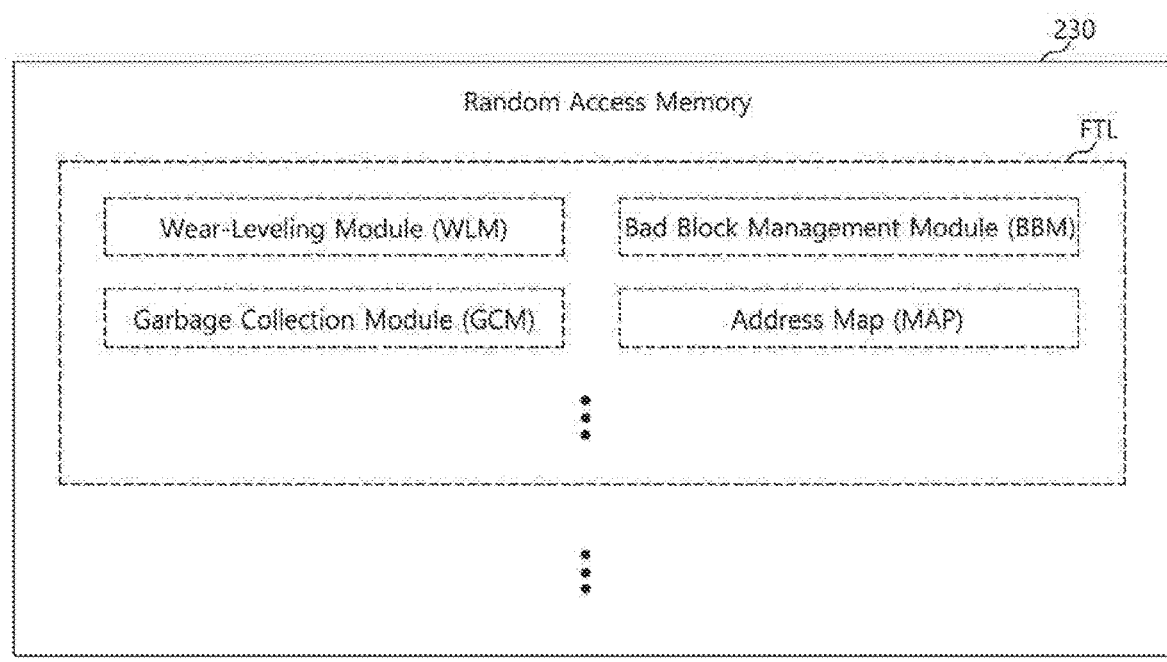
FIG. 3 is a diagram describing a software driven in the data storage device shown in FIG. 1.

FIG. 3 is a diagram describing software driven in the data storage device 100 shown in FIG. 1.

When the nonvolatile memory device 300 is configured as a flash memory device, the control unit 220 may drive a software referred to as a flash translation layer FTL, to control intrinsic operations of the flash memory device 300 and provide device compatibility to the host device. Through driving of such a flash translation layer FTL, the data storage device 100 may be recognized by the host device, and used as a general data storage device such as a hard disk.

The flash translation layer FTL loaded on the random access memory 230 may be configured by modules for performing various functions and metadata necessary for driving of the modules. For example, referring to FIG. 3, the flash translation layer FTL may include an address map MAP, a wear-leveling module WLM, a bad block management module BBM and a garbage collection module GCM. The configuration of the flash translation layer FTL is not limited to the above-described modules, and may further include modules such as an interleaving module for operating flash memory devices 300 in parallel, a sudden power-off management module for being prepared for an unexpected power-off, and so forth.

The wear-leveling module WLM may manage wear levels for memory blocks of the flash memory device 300. Memory cells of the flash memory device 300 may be aged by an erase operation and a program operation. Aged memory cells, that is, worn-out memory cells may cause fails for example, physical defects. The wear-leveling module WLM may manage the program-erase counts of respective memory blocks to be leveled so as to prevent a certain memory block from being worn out faster than the other memory blocks.

The bad block management module BBM may manage a memory block in which a fail has occurred, among the memory blocks of the flash memory device 300. As described above, a fail for example, a physical defect may occur in a worn-out memory cell. Data stored in a failed memory cell may not be read normally, or data may not be stored normally in a failed memory cell. The bad block management module BBM may manage a memory block including a failed memory cell, in such a way so it is not to be used.

The flash memory device 300 does not support overwrite of data due to a structural characteristic thereof. If data is stored in a memory cell in which data is written, reliability of the stored data may not be ensured. Therefore, in order to rewrite data in a memory cell which has already stored data, an erase operation should be preceded. The erase operation of the flash memory device 300 requires a lengthy time. For this reason, the control unit 220 stores data in another memory cell which has been already returned to an erased state without storing the data in an erased memory cell after erasing a memory cell which is stored data. By this operation of the control unit 220, valid data and invalid data are mixed in the flash memory device 300. As the occasion demands, the control unit 220 may perform a series of operations of collecting valid data to a place and erasing invalid data, that is, a garbage collection operation. The garbage collection operation may be referred to as a merge operation.

When the host device accesses the data storage device 100, for example, the host device requests a read operation or a write operation to the data storage device 100, the host device may provide a logical address to the data storage device 100. The flash translation layer FTL may translate the logical address into a physical address of the flash memory device 300, and perform a requested operation by referring to the physical address. In order for such an address translation operation to occur, address mapping information, that is, the address map MAP, may be included in the flash translation layer FTL.

Figure 4:
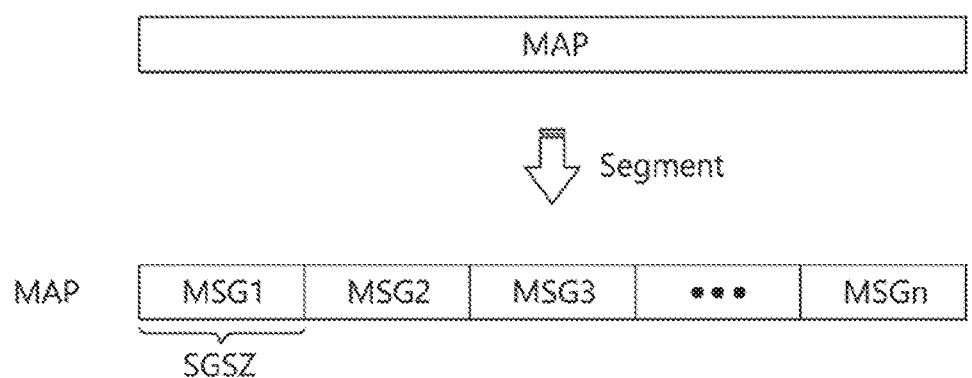
FIG. 4 is a diagram explaining an address map segment size that means a unit by which an address map is segmented, in accordance with an embodiment of the present invention.
Figures 5, 6:
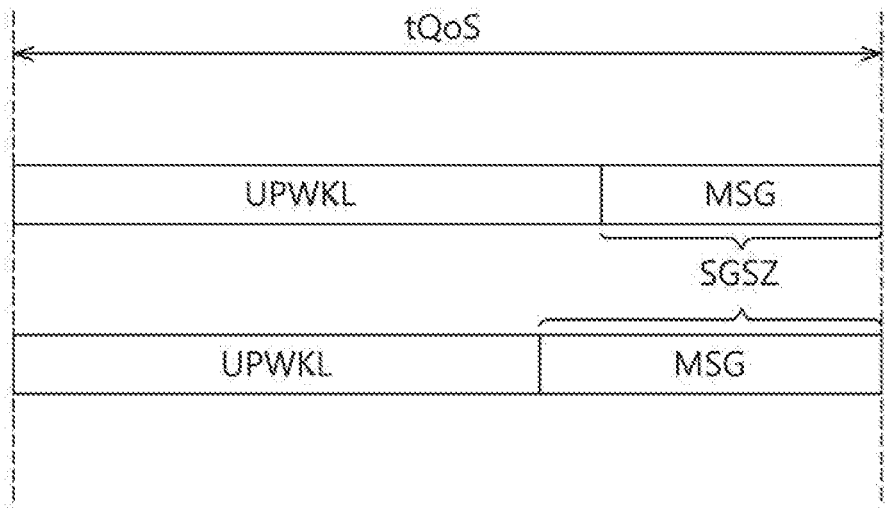
FIG. 5 is a diagram describing an address map segment size that is changeable depending on a workload, in accordance with an embodiment of the present invention.
FIG. 6 is a diagram explaining a method for setting an address map segment size, in accordance with an embodiment of the present invention.

FIG. 4 is a diagram describing an address map segment size that means a unit by which an address map is segmented, in accordance with an embodiment of the present invention. FIG. 5 is a diagram describing an address map segment size that is changeable depending on a workload, in accordance with an embodiment of the present invention.

The address map MAP may be referenced and updated frequently during the runtime of the data storage device 100. To prevent updated address mapping information from being lost, the address map MAP may often be flushed or backed up in the flash memory device 300.

If the address map MAP is flushed entirely at once, a long time may be taken to the extent that a request of the host device cannot be processed. That is, if it takes a long time to flush the address map MAP, a time allowed to process a request of the host device may not be satisfied. The time allowed to process a request of the host device means a time for ensuring quality of service (QoS) for the request, and, hereinafter, will be referred to as a quality of service time tQoS. The quality of service time tQoS may be a time that is prescribed according to the transmission protocol between the host device and the data storage device 100.

Thus, the address map MAP may be flushed by being segmented such that a request may be processed within the quality of service time tQoS. As shown in FIG. 4, the address map MAP may be segmented by a plurality of address map segments MSG1 to MSGn according to a segment size SGSZ, and flushed by the unit of each of the address map segments MSG1 to MSGn. At least one of the address map segments MSG1 to MSGn may be flushed after an unprocessed workload UPWKL is processed.

The segment size SGSZ as the segment unit of the address map MAP may be changed during the runtime of the data storage device 100. For example, as shown in FIG. 5, the segment size SGSZ may be changed depending on the unprocessed workload UPWKL. Hence, the segment size SGSZ of an address map segment MSG to be flushed may be decreased as the amount of the unprocessed workload UPWKL is increased, and may be increased as the amount of the unprocessed workload UPWKL is decreased.

FIG. 6 is a diagram describing an operation of the control unit 220 which sets an address map segment size, in accordance with an embodiment of the present invention.

The control unit 220 may set the segment size SGSZ by a size that is obtained by subtracting a data amount DT_UPWKL for processing an unprocessed workload from a data amount DT_QoS capable of being processed within the quality of service time tQoS. In other words, the control unit 220 may set the segment size SGSZ such that at least one address map segment MSG may be flushed in a time left after processing a request of the host device.

The data amount DT_UPWKL may include a data amount for processing a request of the host device. For example, the data amount DT_UPWKL may be calculated depending on an amount of data write-requested from the host device. When a background operation such as garbage collection should be preceded to process a request of the host device, the data amount DT_UPWKL may additionally include a data amount for processing the background operation.

The data amount DT_QoS may be calculated as the product of a maximum count capable of programming pages within the quality of service time tQoS and the size of the super page SP of FIG. 2. The maximum count for the quality of service time tQoS may be calculated by dividing the quality of service time tQoS by a time tPROG required to program one page. The size of the super page SP may be calculated as the product of the size of one page PG, the number of planes PL per die and the number of dies D, which configure one super page.

While various embodiments have been described above, it will be understood to those skilled in the art that the embodiments described are examples only. Accordingly, the data storage device and the operating method thereof described herein should not be limited based on the described embodiments.

Figure 7:
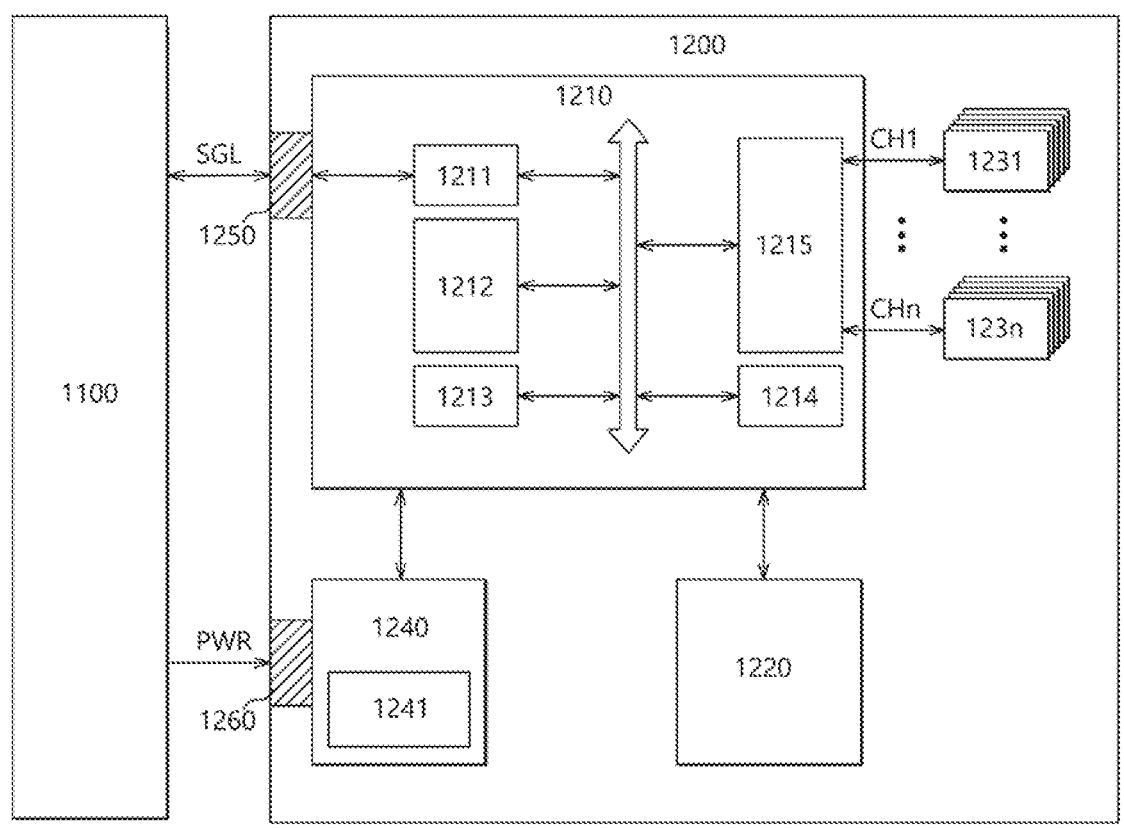
FIG. 7 is a diagram illustrating a data processing system including a solid state drive, in accordance with an embodiment of the present invention.

FIG. 7 is a diagram illustrating a data processing system 1000 including a solid state drive (SSD) 1200, in accordance with an embodiment of the present invention.

Referring to FIG. 7, the data processing system 1000 may include a host device 1100 and the SSD 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL inputted from the host device 1100. The control unit 1212 may control operations of internal function blocks according to a firmware or a software for driving the SSD 1200. The random access memory 1213 may be used as a working memory for driving such a firmware or software.

The ECC unit 1214 may generate parity data of data to be transmitted to the nonvolatile memory devices 1231 to 123n. The generated parity data may be stored together with the data in the nonvolatile memory devices 1231 to 123n. The ECC unit 1214 may detect an error of the data read from the nonvolatile memory devices 1231 to 123n, based on the parity data. If a detected error is within a correctable range, the ECC unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 8:
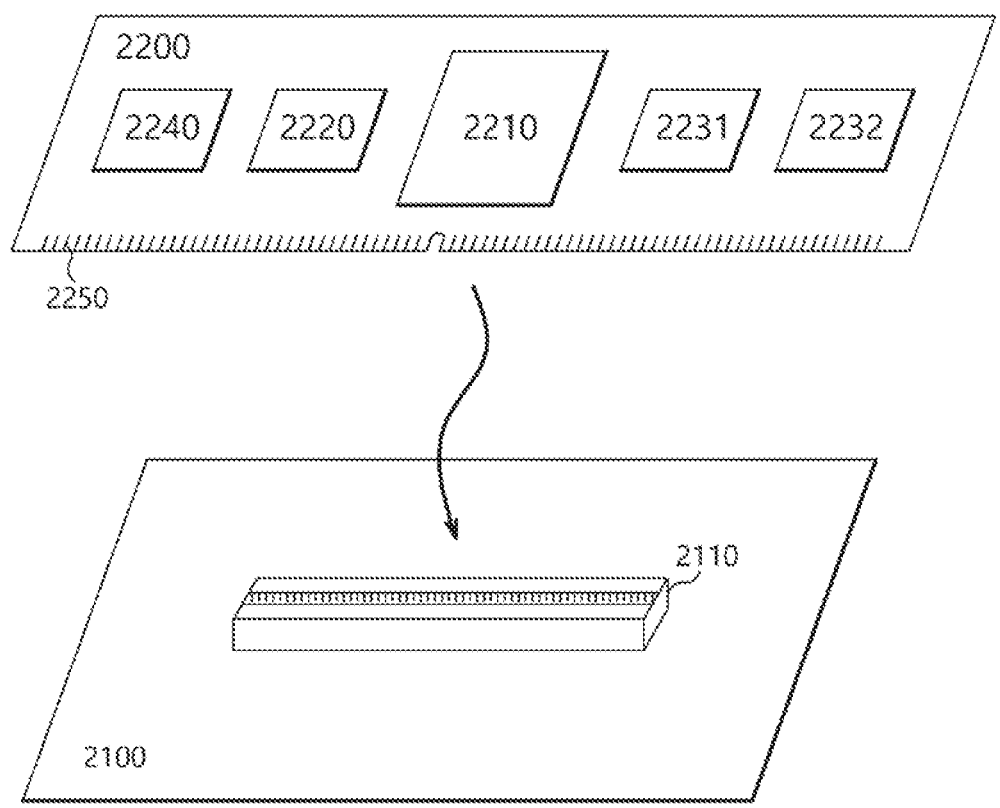
FIG. 8 is a diagram illustrating a data processing system including a data storage device, in accordance with an embodiment of the present invention.

FIG. 8 is a diagram illustrating a data processing system 2000 including a data storage device 2200, in accordance with an embodiment of the present invention.

Referring to FIG. 8, the data processing system 2000 may include a host device 2100 and the data storage device 2200.

The host device 2100 may be configured in the form of a board such as a printed circuit board (PCB). Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 7.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 9:
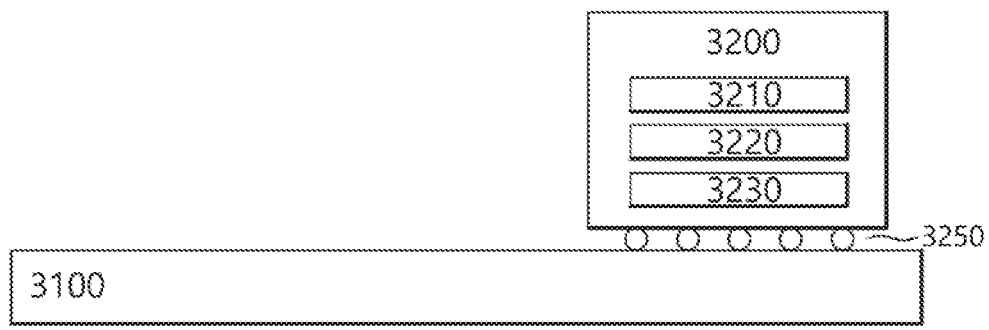
FIG. 9 is a diagram illustrating a data processing system including a data storage device, in accordance with an embodiment of the present invention.

FIG. 9 is a diagram illustrating a data processing system 3000 including a data storage device 3200, in accordance with an embodiment of the present invention.

Referring to FIG. 9, the data processing system 3000 may include a host device 3100 and the data storage device 3200.

The host device 3100 may be configured in the form of a board such as a printed circuit board (PCB). Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 7.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 10:
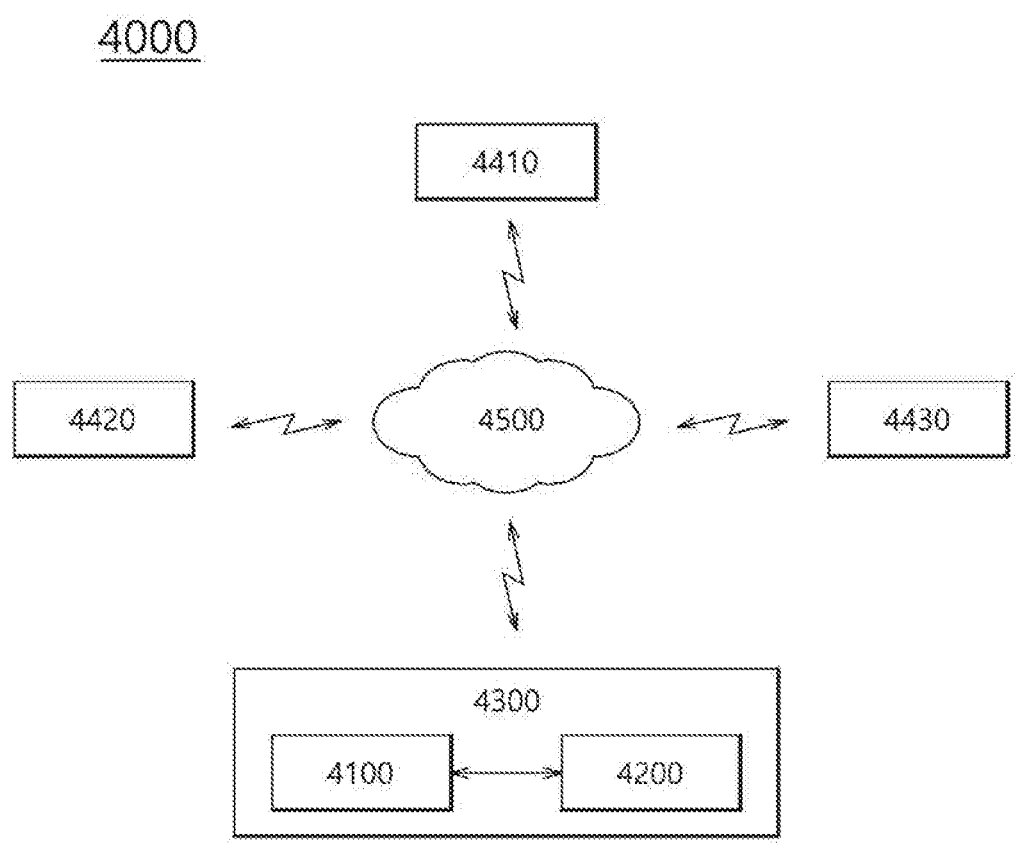
FIG. 10 is a diagram illustrating a network system including a data storage device, in accordance with an embodiment of the present invention.

FIG. 10 is a diagram illustrating a network system 4000 including a data storage device 4200, in accordance with an embodiment of the present invention.

Referring to FIG. 10, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the data storage device 4200. The data storage device 4200 may be configured as the data storage device 100 shown in FIG. the data storage device 1200 shown in FIG. 7, the data storage device 2200 shown in FIG. 8 or the data storage device 3200 shown in FIG. 9.

While various embodiments have been described above, it will be understood to those skilled in the art that the embodiments described are examples only. Accordingly, the data storage device and the operating method thereof described herein should not be limited based on the described embodiments. It will be apparent to those skilled in the art to which the present invention pertains that various other changes and modifications may be made without departing from the spirit and scope of the invention as defined in the following claims.

What is claimed is:

1. A data storage system comprising:
a nonvolatile memory device for storing data including host data provided by a host;
a random access memory for storing meta data for managing the host data; and
a control unit configured to process a request provided by the host and adaptively flush the meta data stored in the random access memory to the nonvolatile memory device based on a quality of service requirement for the request provided by the host,
wherein the quality of service requirement for the request relates to a type of the host;
wherein the control unit segments the meta data by a plurality of segments based on the quality of service requirement for the request and flushes by an unit of each of the plurality of segments;
wherein a size of each of the plurality of segments is changed during a runtime of the data storage system;
wherein the size of each of the plurality of segments is changed depending on a data amount for processing an unprocessed workload; and
wherein the data amount for processing the unprocessed workload includes a data amount for processing a background operation to be preceded to process the request.

2. The data storage system according to claim 1, wherein an amount of the meta data flushed to the nonvolatile memory device is determined based on the quality of service requirement for the request provided by the host.

3. The data storage system according to claim 1, wherein the control unit flushes a portion of the meta data for satisfying the quality of service requirement for the request.

4. The data storage system according to claim 1, wherein the control unit sets the size of each of the plurality of segments based on a data amount to be processed within the quality of service requirement for the request and the data amount for processing the unprocessed workload.

5. The data storage system according to claim 1, wherein the meta data includes an address map.

6. A data storage system comprising:
a nonvolatile memory device for storing data including host data provided by a host;
a random access memory for storing meta data for managing the host data; and
a control unit configured to process a plurality of requests provided by the host and flush the meta data stored in the random access memory to the nonvolatile memory device with satisfying a quality of service requirement for the plurality of requests, wherein the control unit segments the meta data by a plurality of segments based on the quality of service requirement for the plurality of requests and flushes by an unit of each of the plurality of segments;

wherein a size of each of the plurality of segments is changed during a runtime of the data storage system;

wherein the size of each of the plurality of segments is changed depending on a data amount for processing an unprocessed workload; and wherein the data amount for processing the unprocessed workload includes a data amount for processing a background operation to be preceded to process the plurality of requests.

7. The data storage system according to claim 6, wherein the quality of service requirement for the plurality of requests relates to a type of the host.

8. The data storage system according to claim 6, wherein an amount of the meta data flushed to the nonvolatile memory device between processing the plurality of the requests depends on the quality of service requirement for the plurality of requests.

9. An operating method for a data storage system comprising:

storing meta data in a random access memory;

processing a plurality of requests provided by a host; and flushing a portion of the meta data to a nonvolatile memory device to satisfy a quality of service requirement which relates to a type of the host, wherein the flushing of the portion of the meta data includes:

segmenting the meta data by a plurality of segments based on the quality of service requirement; and flushing by an unit of each of the plurality of segments, wherein a size of each of the plurality of segments is changed during a runtime of the data storage system, and wherein the size of each of the plurality of segments is changed depending on a data amount for processing an unprocessed workload; and wherein the data amount for processing the unprocessed workload includes a data amount for processing a background operation to be preceded to process the plurality of requests.

10. The operating method according to claim 9, further comprising:

setting the size of each of the plurality of segments based on a data amount to be processed within the quality of service requirement and the data amount for processing the unprocessed workload.

11. The operating method according to claim 10, wherein the meta data includes an address map.

12. A data storage system comprising:

a nonvolatile memory device for storing data including host data provided by a host;

a random access memory for storing meta data for managing the host data; and a control unit configured to process a request provided by the host and adaptively flush the meta data stored in the random access memory to the nonvolatile memory device with relation to a quality of service requirement for the request provided by the host, wherein the quality of service requirement for the request relates to a type of the host;

wherein the control unit segments the meta data by a plurality of segments based on the quality of service requirement for the request and flushes by an unit of each of the plurality of segments;

wherein a size of each of the plurality of segments is changed during a runtime of the data storage system;

wherein the size of each of the plurality of segments is changed depending on a data amount for processing an unprocessed workload; and wherein the data amount for processing the unprocessed workload includes a data amount for processing a background operation to be preceded to process the request.

13. A data storage system comprising:

a nonvolatile memory device for storing user data received from a host;

a random access memory for storing meta data related to the user data; and a control unit configured to change a minimum unit of the meta data that is flushed to the nonvolatile memory device based on a data amount to be processed within a quality of service requirement for a request received from the host and a data amount for processing an unprocessed workload, wherein the control unit segments the meta data by a plurality of segments based on the quality of service requirement for the request and flushes by an unit of each of the plurality of segments;

wherein a size of each of the plurality of segments is changed during a runtime of the data storage system;

wherein the size of each of the plurality of segments is changed depending on the data amount for processing the unprocessed workload; and wherein the data amount for processing the unprocessed workload includes a data amount for processing a background operation to be preceded to process the request.

14. An operating method for a data storage system including a nonvolatile memory device comprising:

storing meta data in a random access memory;

processing a request received from a host; and changing a minimum unit of the meta data that is flushed to the nonvolatile memory device based on a data amount to be processed within a quality of service requirement for the request received from the host and a data amount for processing an unprocessed workload, wherein the data amount for processing the unprocessed workload includes a data amount for processing a background operation to be preceded to process the request.

* * * * *